United States Patent
Henricson

[11] Patent Number: 6,106,667
[45] Date of Patent: Aug. 22, 2000

[54] TREATMENT OF RECYCLED BLEACH PLANT FILTRATES

[75] Inventor: Kaj Henricson, Helsinki, Finland

[73] Assignee: Ahlstrom Machinery Inc., Glens Falls, N.Y.

[21] Appl. No.: 07/861,387

[22] Filed: Mar. 31, 1992

Related U.S. Application Data

[63] Continuation-in-part of application No. 07/839,389, Feb. 21, 1992, abandoned.

[51] Int. Cl.$^7$ .............................. D21C 9/02; D21C 9/153
[52] U.S. Cl. ................................. 162/37; 162/60; 162/65; 162/76
[58] Field of Search .................................. 162/19, 60, 65, 162/89, 40, 37, 50, 76

[56] References Cited

U.S. PATENT DOCUMENTS

| | | | |
|---|---|---|---|
| 3,759,783 | 9/1973 | Samuelson et al. | 162/65 |
| 4,196,043 | 4/1980 | Singh . | |
| 4,372,812 | 2/1983 | Phillips et al. | 162/65 |
| 4,543,155 | 9/1985 | Stawicki | 162/89 |
| 4,806,203 | 2/1989 | Elton | 162/65 |
| 5,061,343 | 10/1991 | Azarniouch et al. | 162/50 |
| 5,211,811 | 5/1993 | Griggs et al. | 162/65 |

FOREIGN PATENT DOCUMENTS 1159165  12/1983  Canada .

Primary Examiner—Steve Alvo
Attorney, Agent, or Firm—Nixon & Vanderhye P.C.

[57] ABSTRACT

Filtrates from bleach plants for cellulosic (paper) pulp non-chlorine bleaching sequences are treated to minimize the consumption of ozone in ozone bleaching stages. Organic material in the filtrate used in a washer just prior to an ozone stage is oxidized to make the organic material less attractive to the ozone. It may be oxidized by indirectly heating the filtrate, and then reacting it with oxygen gas in a reactor. Alkali may be added to the filtrate in the reactor. Metallic ions are also removed from the system by applying an electrical potential either to the filtrate, an entire washer prior to the ozone stage, or to the pulp line prior to the ozone stage. All of the wash filtrates are treated and recirculated so as not to discharge any wash filtrates into the environment, or so that the only wash filtrate discharged from the washing system of the bleaching plant is a small stream used for smelt dissolution. A typical non-chlorine bleaching sequence utilized may be OAZEZP.

15 Claims, 2 Drawing Sheets

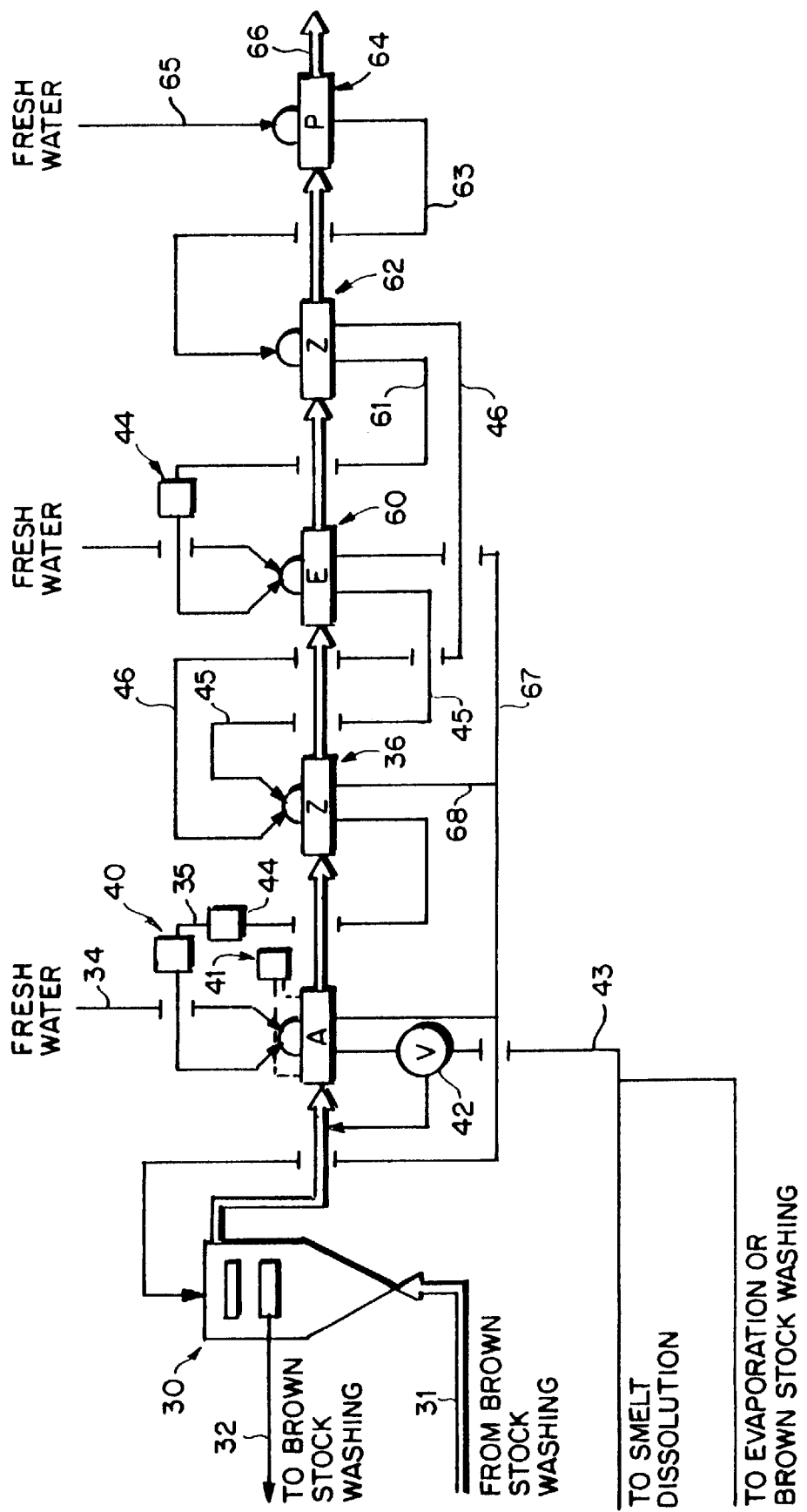

TREATMENT OF RECYCLED BLEACH PLANT FILTRATES

RELATED APPLICATIONS

This application is a continuation-in-part of application Ser. No. 07/839,389 filed Feb. 21, 1992, and now abandoned, the disclosure of which is hereby incorporated by reference herein.

BACKGROUND AND SUMMARY OF THE INVENTION

Utilizing procedures such as described in the parent application, the environmental impact from the production of kraft pulp can be greatly minimized. Utilizing the techniques described in that application, and employing a few additional techniques according to the present invention, it is possible to "close" a bleaching system of a kraft pulping facility so that there is no or very small discharge of washing filtrates, or the like, into the environment; or it is possible to substantially close the bleaching system so that the only discharge from the washing/bleaching system is a small stream of wash filtrate used in smelt dissolution (or effectively treated so that there is essentially zero pollution associated with it when discharged).

Perhaps the most promising bleaching chemical—as described in the parent application—for allowing chlorine to be eliminated while still achieving effective bleaching, is ozone. While ozone has been known as a bleaching agent for a long time, it has not been commercially used on an industrial scale in pulp production until very recently in view of recent rapid developments in machine and process technologies, because of long standing problems.

A major problem encountered in utilizing ozone is high ozone consumption. Ozone consumption may be unreasonable high if there are too many metallic ions, which react with the ozone, or if the ozone reacts with organic material in the liquid phase of the pulp rather than reacting with the pulp fibers. It is highly desirable to have the ozone react only with fibers so that the ozone consumption is minimized, making ozone bleaching practical as well as effective, and allowing "closing" of a bleach plant.

As disclosed in the parent application, one way in which the volume of metallic ions can be decreased is by improving the washing after the acid stage, where the majority of the metallic ions are dissolved. Another way to reduce the load of metallic ions, according to the present invention, is to utilize an electrical potential. The electrical potential can be applied over the washer, or the filtrate supplied to the washer, or even to the pulp prior to the ozone stage. A preferred way to apply the electric field is to have the filtrate being used as washwater to go through a chamber where there is a suitable electric potential. In this way the filtrate is cleaned of metallic ions before being used as wash water. The electrical potential can effect sufficient removal of ions so as to allow complete closing of the bleaching plant, or to provide that the amount of wash filtrate from the acid stage is so small that it is completely consumed in smelt dissolution, and cooking liquor preparation.

According to the present invention, the amount of organic material in the liquid phase is made non-attractive to the ozone by oxidizing the organic material. Since ozone is a strong oxidant, it is more likely to react with the fibers than with the already oxidized organic material in the liquid phase. It is perhaps not possible to oxidize all dissolved material in the liquid phase, but a considerable part can be oxidized with oxygen prior to applying the ozone. However there is always a significant amount of organic material in the wash filtrates used during washing of the pulp prior to the ozone stage so that if that organic material is oxidized, the ozone consumption in the following ozone bleaching stage can be significantly reduced.

According to one aspect of the present invention, a method of treating filtrates from bleach plants for bleaching cellulosic pulp, including utilizing at least one ozone bleaching stage, is provided. The method comprises the steps of: (a) Washing the pulp in a washer with a wash liquid prior to the ozone bleaching stage, the wash liquid including filtrate from another washing stage of a bleaching stage. (b) Oxidizing the organic material in the filtrate used as wash liquid in step (a) prior to its use in step (a) in order to make the organic material less attractive to ozone in the ozone bleaching stage. And, (c) ozone bleaching the washed pulp in the at least one ozone bleaching stage. Step (b) may be practiced by indirectly heating the filtrate (as with already oxidized filtrate in the heat exchanger), and then reacting the heated filtrate with oxygen containing gas, such as the oxygen carrier gas with residual ozone discharged from the ozone bleaching stage. Alkali can be added to the filtrate and oxygen during the reacting step if desired.

There may also be the further step (d) of removing metallic ions from the filtrate so as to minimize the consumption of ozone in step (c), by applying electrical potential to the filtrate.

All of the steps are preferably practiced with the pulp at a medium consistency, e.g. of about 5–18%.

Practicing the present invention, and the techniques from the parent application, a method of continuously kraft pulping and then bleaching comminuted cellulosic fibrous material may be provided which comprises the following steps: (a) Continuously digesting the material to produce pulp having a Kappa Number comparable to about 20 or below for softwood. (b) Subjecting the digested pulp to hot alkali extraction and/or oxygen bleaching so as to produce pulp having a Kappa Number comparable to about 10 or below for softwood. (c) Effecting bleaching of the pulp with non-chlorine containing bleaching chemicals to obtain a bleached pulp having properties comparable to CK pulp bleached with a DEDED sequence. (d) Effecting washing of the pulp with wash filtrates, and to produce wash filtrates, during the practice of step (c). And, (e) treating and recirculating the wash filtrates from step (d) so as to discharge no, or a small amount of, wash filtrates into the environment. Step (c) includes at least one ozone bleaching stage, and step (d) includes washing the pulp with wash filtrate just prior to the ozone bleaching stage; and comprising the further step (f) of oxidizing organic material in the wash filtrate prior to the washing of the pulp just prior to the ozone bleaching so as to make the organic material less attractive to ozone in the ozone bleaching stage. The bleaching sequences may be as described in the parent application, e.g. they may be selected from the group consisting essentially of OOAZEZPZ, OAZEZPZ, OOAZEZP, and OAZEZP, or AZEZPZ or AZEZP if oxygen bleaching is used to lower the Kappa Number to about 10.

Alternatively, step (e) may be the step of treating and recirculating all of the wash filtrates in step (d) so that the only wash filtrate discharged from the washing of step (d) is a small stream used for smelt dissolution (cooking liquor production). If all of the small stream cannot be taken to cooking liquor preparation (smelt dissolution and other associated processes), it is taken to black liquor evaporation. It can be taken to black liquor evaporation directly or by taking it to the brown stock washing plant.

It is the primary object of the present invention to minimize ozone consumption in the ozone bleaching of cellulosic pulp, and/or to produce a closed, or substantially closed, bleach plant in a pulp mill. This and other objects of the invention will become clear from an inspection of the detailed description of the invention and from the appended claims.

BRIEF DESCRIPTION OF THE DRAWINGS

FIG. 2 is a schematic view of the wash aspects of a typical non-chlorine bleaching sequence showing the liquid flow interconnections between the various stages, and schematically illustrating treatments of the filtrates as according to the invention.

DETAILED DESCRIPTION OF THE DRAWINGS

Figure 1:
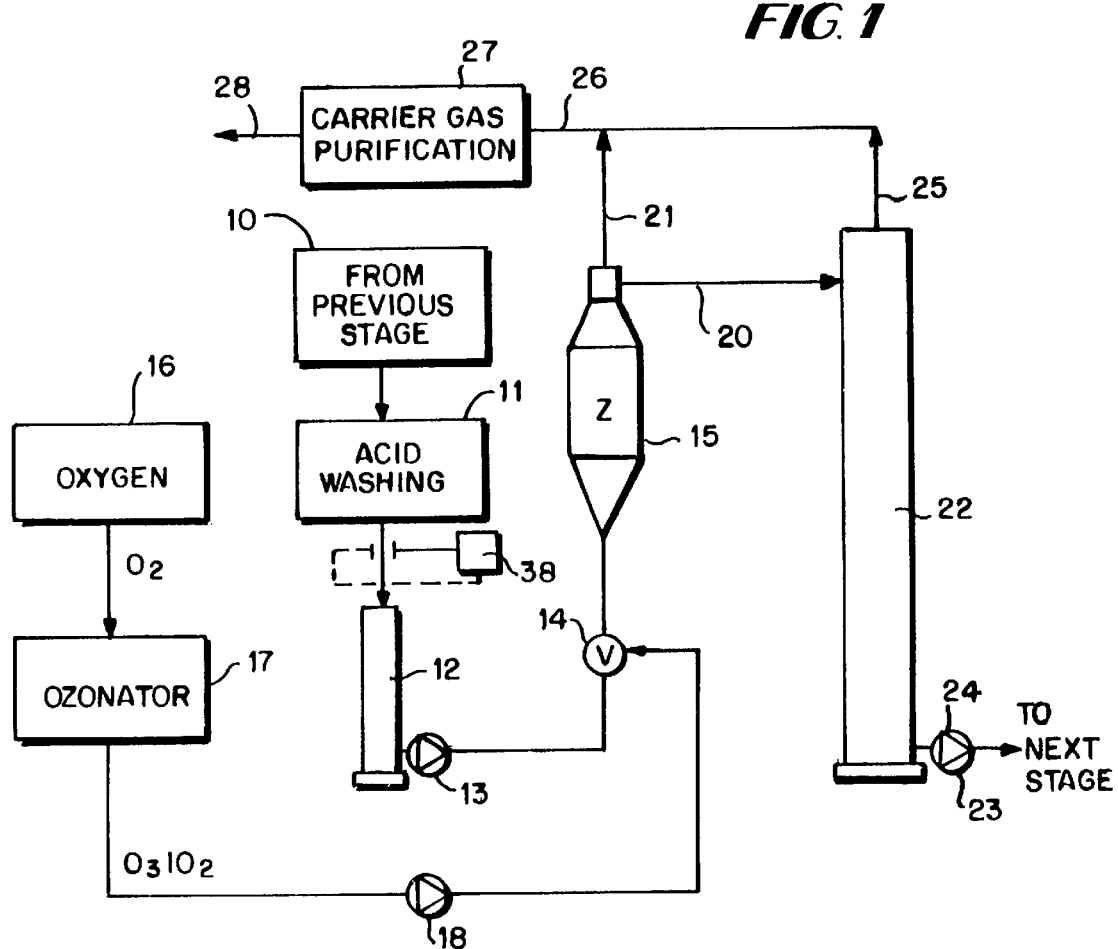
FIG. 1 is a schematic representative of an ozone bleaching stage in a cellulosic pulp bleaching plant.

FIG. 1 schematically illustrates a typical ozone bleaching stage, such as utilized in the chlorine free pulping and bleaching sequence of the parent application, for the practice of the invention. Pulp from a previous stage 10 in the pulping sequence is subjected to acid washing 11, and then fed to a retention vessel 12 from which it is pumped by pump 13 through mixer 14 to the reactor 15. The pulp may be a medium consistency (e.g. about 5–18%), or low consistency. If a medium consistency, a MC® mixer, sold by Kamyr, Inc. of Glens Falls, N.Y., may be utilized to intimately mix the ozone with the pulp.

Oxygen from source 16, which is essentially pure oxygen (e.g. over 90% oxygen) may be treated by ozonator 17, and then pumped by a pump 18 to the mixing element 14 to be mixed with the pulp prior to reactor 15. The element 14 may be a valve or an MC® mixer. The ozone bleached pulp is discharged in line 20, while carrier gas (oxygen), with residual ozone, is discharged at 21. The pulp passes to one or more tanks or vessels 22, subsequently being discharged in line 23, under the influence of pulp 24, to a washer and then to the next pulping stage. Oxygen gas is discharged from vessel 22 into line 25, combined with the discharge gas in line 21 in line 26, and it may be purified in the gas treatment stage 27 so that the gas in line 28 consists essentially of oxygen, perhaps with a small amount of residual ozone.

FIG. 2 illustrates details of the washing sequences that may be associated with a typical non-chlorine bleaching sequence as described in the parent application. FIG. 2 is essentially the same as FIG. 2 in the parent application, only it illustrates various other treatment mechanisms according to the invention. The diffusion washer 30 receives pulp in line 31 from brown stock washing. The pulp in line 31 has already been continuously digested, as with the Kamyr modified continuous cooking process described in the parent application so that the Kappa Number has been reduced to about 20 or below for softwood, and has already been subjected to hot alkali extraction and/or oxygen bleaching so that it has a Kappa Number for softwood of about 10 or below. Typically one or more oxygen delignification (bleaching) stages have also been utilized, and ultimately the pulp will be bleached with non-chlorine containing bleaching chemicals to obtain a bleached pulp having properties comparable to conventional kraft pulp ("CK") bleached with a DEDED sequence. From the diffusion washer 30, filtrate is returned in line 32 to brown stock washing.

The acid washing stage 11 is supplied with fresh water in line 34, and filtrate from other washing stages of the bleaching sequence in line 35. For example line 35 is connected up to the washer 36 for the first ozone stage. According to the present invention, metallic ions can be removed from the system by utilizing the apparatus 38 in FIG. 1, and/or apparatus 40 and/or 41 in FIG. 2. As illustrated in FIG. 1, the electrical potential can be applied by the mechanism 38 directly to the pulp between the acid washing stage 11 and the vessel 12 (at the start of the ozone stage) in addition to, or instead of, the mechanisms 40, 41. Apparatus 40 applies an electrical potential to the filtrate in the line 35, while apparatus 41 applies an electrical potential across the entire washer 11, the electrical potential effecting removal of a substantial number of metallic ions from the system, and thus the pulp being fed to the ozone stage.

The filtrate discharged from washer 11 may pass through a valve 42 to go into the line 43 for smelt dissolution (or other part of the cooking liquor production), or treatment, while at least part is recirculated to the pulp being fed to the washer 11. Depending upon the effectiveness of the bleaching and washing stages, the removal of metallic ions, and the like, the valve 42 may be adjusted so that the stream in line 43 is either just a small stream only sufficient for cooking liquor preparation, or so that the line 43 is completely closed off so that no filtrates from the washing system associated with the bleaching sequence of FIG. 2 go out from the fiberline. It is also possible to take filtrate to the black liquor evaporation plant or some part of the brown washing system and thus ultimately burn the contaminants in the recovery boiler.

Figure 3:
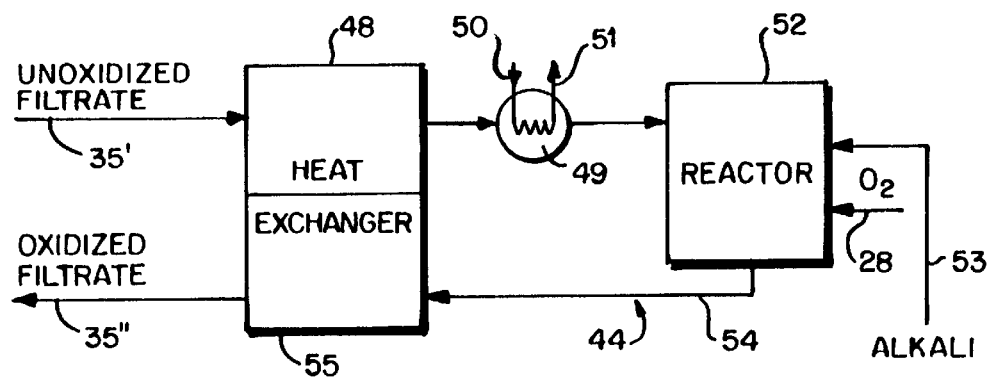
FIG. 3 is a schematic representation of one of the particular filtrate treatments shown only as a block in FIG. 2.

According to the present invention, apparatus 44 is utilized in association with the washing stage prior to each ozone bleaching stage to make organic material in the liquid phase less attractive to the ozone. The structure 44 treats the filtrate in the washer prior to the ozone stage, and after the bleaching stage prior to the ozone stage. A typical apparatus 44 is illustrated in more detail in FIG. 3.

Unoxidized filtrate in line 35' (part of 35) passes to the heat exchanger compartment 48 where it is brought into heat exchange relationship with oxidized filtrate in line 35". In order to improve oxidation and heat economy, in addition to using the heat exchanger 48 another indirect heat exchanger 49 may be utilized which has line 50 leading into it and line 51 leading away from it. Hot water or steam may be supplied to the line 50 so that the unoxidized filtrate is heated. The unoxidized filtrate is then fed to a reactor 52 where oxygen containing gas, typically consisting essentially of oxygen (perhaps with some residual ozone) is added. The oxygen may be from the line 28 (see FIG. 1).

Oxidation also may be improved by adding alkali in line 53 to the reactor 52. Adding alkali keeps the pH high, and may be desirable since carbon dioxide which is favored during oxidation lowers the pH. However if one desires the pH to drop during oxidation and thus obtain an acid filtrate, which can be used to lower the pH of the Z stage following the washer 11, no alkali will be added in line 53. Residual gases remaining after the oxidation takes place in reactor 52 can either be removed in the reactor 52, or after cooling the oxidized filtrate in heat exchanger chamber 55 to which the oxidized filtrate is supplied via line 54. The oxidized filtrate in line 35" (part of 35) then proceeds to the washer 11 (e.g. through the structure 40).

FIG. 2 also illustrates various other washers and lines, including the washer 60 for the E stage supplied with filtrate from line 61, which is connected to the washer 62 from the second Z stage, which in turn is supplied with filtrate from line 63, connected to the washer 64 associated with the P stage. Fresh water is supplied to the washer 64 via line 65, and the bleached pulp that is produced is discharged in line 66. Filtrate from line 67, connected to washer 60, and from line 68, connected to washer 36, may be supplied to the diffusion washer 30. It is noted that an oxidizing unit 44 is associated with the washer 60 prior to the second ozone stage (having washer 62) too.

Utilizing the system and procedure described above, a closed system, or a substantially closed system, may be provided, in which there is no discharge of filtrates from the bleaching plant, or a minimal discharge (in line 43). An example of the filtrate volume associated with 1, 2, or 3 ozone stages is illustrated in the following tables.

As can be seen from Table 1, the amount of filtrate going into the washers before the first and second ozone stages ($Z_1$ and $Z_2$) in the closed system is 6.7–2.5=4.2 m³/ton/filter, and in a substantially closed system 6.7–4.0=2.7 m³/ton pulp/filter. In this case when the consistency of the pulp during washing is 15%, about 6.7 m³ of total wash water is used on each filter. If a washer consistency of 10% had been used, the use of total wash water on the washer would have been about 10 m³/ton pulp/washer, and the use of a filtrate would have been somewhat higher than in the above calculations. These relatively small recirculated filtrate flows (e.g. 2.7–4.2 m³/ton pulp/washer) to the washers ahead of each of the Z stages can easily be oxidized by the oxygen gas in line 28. Also, Table 2 shows that the amount of metallic ions is small enough so as to be effectively handled too.

TABLE 1

Water Usage in Bleach Plant

| System | Fresh Water Usage m³/ton pulp | | | Waste Water m³/ton pulp |
| --- | --- | --- | --- | --- |
| | $Z_1$ | $Z_2$ | $Z_3$ | |
| Closed | 2.5 | 2.5 | 6.7 | 4.3 |
| Substantially Closed | 4.0 | 4.0 | 6.7 | 7.3 |
| Open | 6.7 | 6.7 | 6.7 | 12.7 |

The waste water streams in Table 1 can be taken to white liquor preparation, particularly smelt dissolution. About 2–4 m³ can be used for this purpose. The rest of the waste water can be taken to brown stock washing, or black liquor evaporation. Also some, especially in the open case, may have to go to waste water treatment.

TABLE 2

Metallic Ions Distribution

| System | Metallic ions % of total dissolved in A-stage | | | Waste Water |
| --- | --- | --- | --- | --- |
| | $Z_1$ | $Z_2$ | $Z_3$ | |
| Closed | 25% | 2% | 2% | 75% |
| Substantially Closed | 15% | 1% | 1% | 90% |
| Open | 10% | <1% | <1% | 95% |

TABLE 3

Accumulation of Organic Material

| System | Dissolved Organic Material Present in Stage kg/ton Pulp | | |
| --- | --- | --- | --- |
| | $Z_1$ | $Z_2$ | $Z_3$ |
| Closed | 9 | 10 | 2 |
| Substantially Closed | 4 | 6 | 2 |
| Open | 2 | 3 | 2 |

Practicing the present invention, and the techniques from the parent application, a method of continuously kraft pulping and then bleaching comminuted cellulosic fibrous material may be provided which comprises the following steps: (a) Continuously digesting the material to produce pulp having a Kappa Number comparable to about 20 or below for softwood. (b) Subjecting the digested pulp to hot alkali extraction and/or oxygen bleaching so as to produce pulp having a Kappa Number comparable to about 10 or below for softwood. (c) Effecting bleaching of the pulp with non-chlorine containing bleaching chemicals to obtain a bleached pulp having properties comparable to CK pulp bleached with a DEDED sequence. (d) Effecting washing of the pulp with wash filtrates, and to produce wash filtrates, during the practice of step (c). And, (e) treating and recirculating the wash filtrates from step (d) so as to discharge no, or a small amount of, wash filtrates into the environment. Step (c) includes at least one ozone bleaching stage, and step (d) includes washing the pulp with wash filtrate just prior to the ozone bleaching stage; and comprising the further step (f) of oxidizing organic material in the wash filtrate prior to the washing of the pulp just prior to the ozone bleaching so as to make the organic material less attractive to ozone in the ozone bleaching stage. The bleaching sequences may be as described in the parent application, e.g. they may be selected from the group consisting essentially of OOAZEZPZ, OAZEZPZ, OOAZEZP, and OAZEZP, or AZEZPZ or AZEZP if oxygen bleaching is used to lower the Kappa Number to about 10.

It will thus be seen that according to the present invention ozone consumption can be minimized in a non-chlorine bleaching sequence, so as to make the non-chlorine bleaching sequence practical. Also, utilizing the teachings of the invention and the parent application a bleaching plant can be closed, or substantially closed.

While the invention has been herein shown and described in what is presently conceived to be the most practical and preferred embodiment it will be apparent to those of ordinary skill in the art that many modifications may be made thereof within the scope of the invention, which scope is to be accorded the broadest interpretation of the appended claims so as to encompass all equivalent methods and procedures.

What is claimed is:

1. A method of treating filtrates from bleach plants for bleaching cellulosic pulp, including utilizing at least one ozone bleaching stage, comprising the steps of:

(a) washing the pulp in a washer with a wash liquid prior to the ozone bleaching stage, the wash liquid including filtrate from another washing stage of a bleaching stage;

(b) oxidizing the organic material in the filtrate used as wash liquid in step (a) prior to its use in step (a) in order to make the organic material less attractive to ozone in the ozone bleaching stage; and (c) ozone bleaching the washed pulp in said at least one ozone bleaching stage.

2. A method as recited in claim 1 comprising the further step (d) of removing metallic ions from the filtrate so as to minimize the consumption of ozone in step (c).

3. A method as recited in claim 2 wherein step (d) is practiced by applying an electrical potential to the filtrate.

4. A method as recited in claim 1 comprising the further step of removing metallic ions from the pulp prior to step (c) by applying an electrical potential across the washer for practicing step (a).

5. A method as recited in claim 1 wherein step (b) is practiced by indirectly heating the filtrate, and then reacting the heated filtrate with oxygen containing gas.

6. A method as recited in claim 5 comprising the further step of adding alkali to the filtrate and oxygen during the reacting step.

7. A method as recited in claim 5 wherein said heating step is accomplished in part by passing filtrate prior to the reacting step into heat exchange relationship with oxidized filtrate after the reacting step.

8. A method as recited in claim 5 wherein step (b) is further practiced by using an oxygen containing gas which consists essentially of oxygen.

9. A method as recited in claim 8 wherein gas consisting essentially of oxygen and residual ozone is discharged during the practice of step (c); and wherein the oxygen containing gas used in the practice of step (b) is that discharged gas.

10. A method as recited in claim 1 comprising the further step of applying an electrical potential to the pulp just prior to step (c) to effect removal of a substantial amount of metallic ions therefrom.

11. A method as recited in claim 1 wherein there are a plurality of washing stages and washing filtrates, and comprising the further step of removing metallic ions from the pulp prior to step (c); and recirculating all filtrates in the washing stages so that there is no discharge of washing filtrates into the environment.

12. A method as recited in claim 1 wherein there are a plurality of washing stages and washing filtrates, and comprising the further step of removing metallic ions from the pulp prior to step (c); and wherein the only discharge of washing filtrate from the washing stages is a small stream of washing filtrate used for cooking liquor preparation.

13. A method as recited in claim 1 wherein steps (a)–(c) are practiced with the pulp at a consistency of about 5–18%.

14. A method as recited in claim 1 wherein there are two ozone bleaching stages, and wherein steps (a)–(c) are practiced for each.

15. A method as recited in claim 1 wherein there are a plurality of washing stages and washing filtrates, and comprising the further step of removing metallic ions from the pulp prior to step (c); and wherein the only discharge of washing filtrate from the washing stages is a small stream of washing filtrate, a part of which is used for cooking liquor preparation, and a part of which is taken to evaporation.

* * * * *